United States Patent [19]
Dumont

[11] Patent Number: 5,916,339
[45] Date of Patent: Jun. 29, 1999

[54] ONE-WAY DRIVE MECHANISM AND CORRESPONDING RATCHET TOOL

[75] Inventor: Bertrand Dumont, Paris, France

[73] Assignee: FACOM, Morangis Cedex, France

[21] Appl. No.: 08/862,407

[22] Filed: May 23, 1997

[51] Int. Cl.[6] .................................................. B25B 13/46
[52] U.S. Cl. ........................... 81/63.1; 81/63.2; 192/43.2
[58] Field of Search ........................ 81/62–63.2, 177.85; 192/43.1, 44, 45

[56] References Cited

U.S. PATENT DOCUMENTS

| | | |
|---|---|---|
| 2,103,556 | 12/1937 | Rueb . |
| 3,783,703 | 1/1974 | Trimble et al. ....................... 81/63.2 X |
| 4,211,127 | 7/1980 | D'Oporto et al. . |
| 4,497,227 | 2/1985 | Stasiek . |
| 4,669,339 | 6/1987 | Cartwright . |
| 5,086,673 | 2/1992 | Korty ................................... 81/63.1 X |
| 5,178,047 | 1/1993 | Arnold et al. . |

FOREIGN PATENT DOCUMENTS

| | | |
|---|---|---|
| 281 285 | 9/1988 | European Pat. Off. . |
| 2 146 078 | 1/1973 | France . |
| 2 408 431 | 10/1977 | France . |
| 2756395 | 6/1978 | Germany ................................. 81/63.1 |

*Primary Examiner*—James G. Smith
*Attorney, Agent, or Firm*—Wenderoth, Lind & Ponack, L.L.P.

[57] ABSTRACT

A one-way drive rotor (3) is accommodated in a bore (4) of a driving part (1) of a tool and is held, on the one hand, by a shoulder (14) integral with the rotor and, on the other hand, by an annular component (7) on which the head (34) of a central screw (13) screwed into the rotor bears. The extent to which this screw is tightened defines the axial play of the rotor. The screw is hollow and has a push rod (9) passing through it which allows a ball (6) to be locked or released, this ball positively retaining a rotary member such as a drive socket, which is fitted onto the end fitting (5) which extends the rotor.

35 Claims, 3 Drawing Sheets

ONE-WAY DRIVE MECHANISM AND CORRESPONDING RATCHET TOOL

BACKGROUND OF THE INVENTION

The present invention relates to a mechanism for the one-way drive of a rotary member of the type including a one-way drive rotor accommodated in a bore of a driving part and equipped with a shoulder which bears on a first bearing face of the driving part at one end of the bore. An annular component of an outside diameter greater than the diameter of the bore bears on a second bearing face of the driving part at the other end of the bore. An axial holding and adjustment screw passes through the annular component, bears directly or indirectly thereon via its head and is screwed into the rotor. The rotor thus is held axially in the bore between the annular component and the shoulder with an axial clearance which is set, as a function of the actual distance between the two bearing faces, by adjusting the screw, the rotor being equipped with an axial end fitting for driving the rotary member. This end fitting being provided with a duct which opens onto its lateral surface and accommodates a retaining element for holding the rotary member on the end fitting.

Numerous free-wheel arrangements are known, especially in ratchet tools such as ratchet wrenches, in which a rotor is accommodated in a bore of a driving part. A pawl for preventing drive in one direction is provided in a housing of the driving part or of the rotor. Using a wedge effect, this pawl immobilizes the rotor with respect to the driving part in just one direction.

In some of these arrangements the rotor has a driving end fitting equipped with a spring-loaded snap-fastening ball. A complementary rotary member, for example a socket designed to be fitted onto the driving end fitting, has a housing of complementary shape so that it can receive the end fitting and the ball. In particular, the walls of the housing have a recess, especially a groove, for accommodating the protruding part of the snap-fastening ball.

The snap-fastening ball holds the rotary member on the driving end fitting. However, if the rotary member is pulled along the axis of the driving end fitting, it can be extracted by retracting the snap-fastening ball. This sometimes leads to unintentional disconnection of the rotary member.

SUMMARY OF THE INVENTION

The object of the present invention is to provide a one-way drive mechanism which does not display the abovementioned drawbacks and in particular allows a rotary member, push-fitted onto the driving end fitting to be locked on.

To this end, the subject of the invention is a one-way drive mechanism of the aforementioned type, characterized in that the holding and adjustment screw includes an axial passage extended into the rotor by a duct. The passage and the duct accommodate a rod for controlling a retaining element, which rod can be displaced between a position for locking the rotary member, in which position the retaining element is blocked, protruding out from the end fitting, and a release position in which the retaining element can be retracted into the end fitting.

Another object of the invention is a ratchet tool including a drive mechanism as defined hereinabove.

BRIEF DESCRIPTION OF THE DRAWINGS

The invention will be better understood from reading the description which will follow, given solely by way of example and making reference to the drawings in which.

DETAILED DESCRIPTION OF THE PREFERRED EMBODIMENTS

Figure 1:
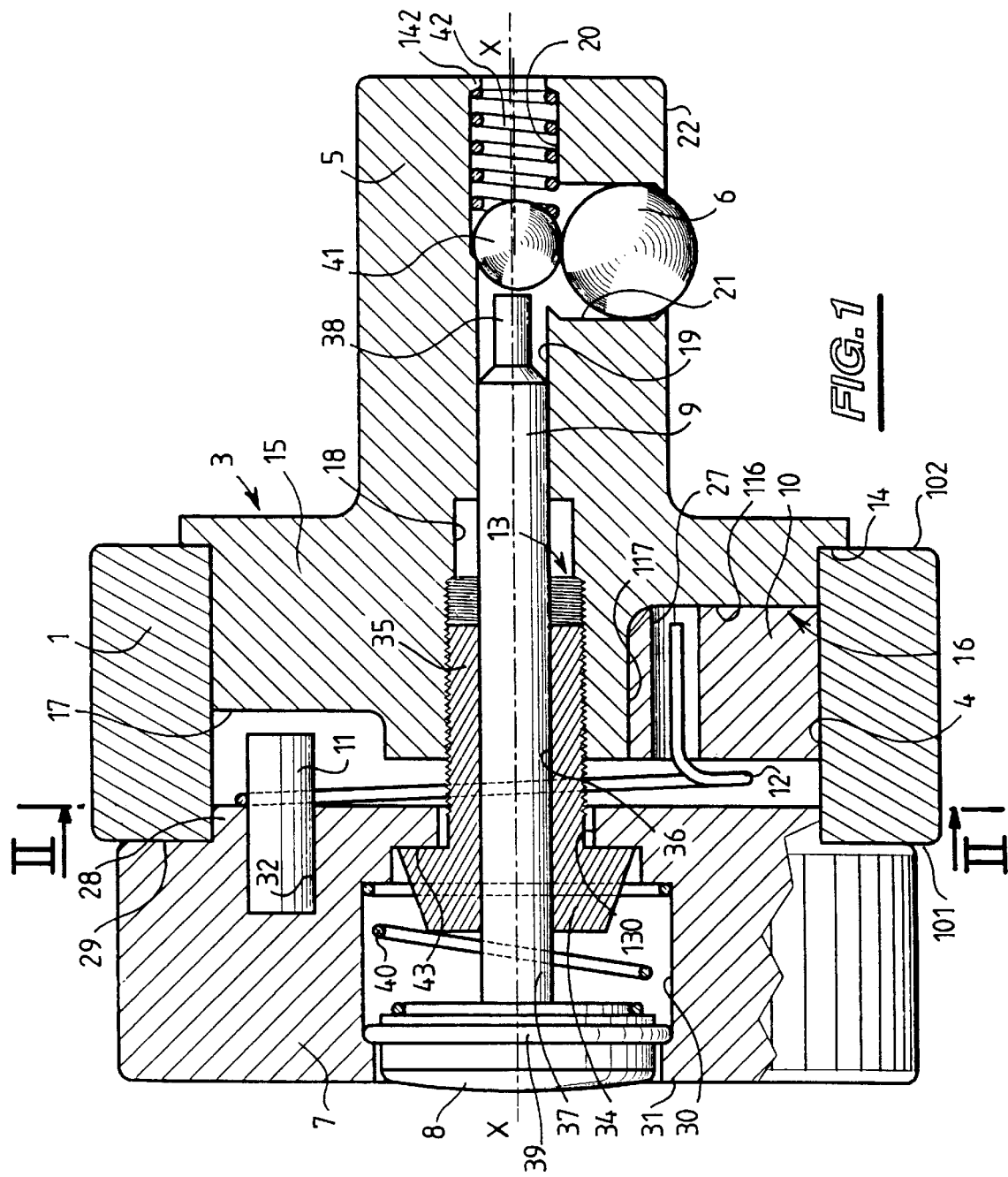
FIG. 1 is a view in longitudinal section of the head of a ratchet wrench equipped with a one-way drive mechanism according to the invention.

Throughout the description which follows, elements which are identical or similar are denoted, in the various embodiments, by the same reference numeral. The expressions "left-hand" and "right-hand" relate to orientation of the tool in FIGS. 1, 3 and 5.

Figure 2:
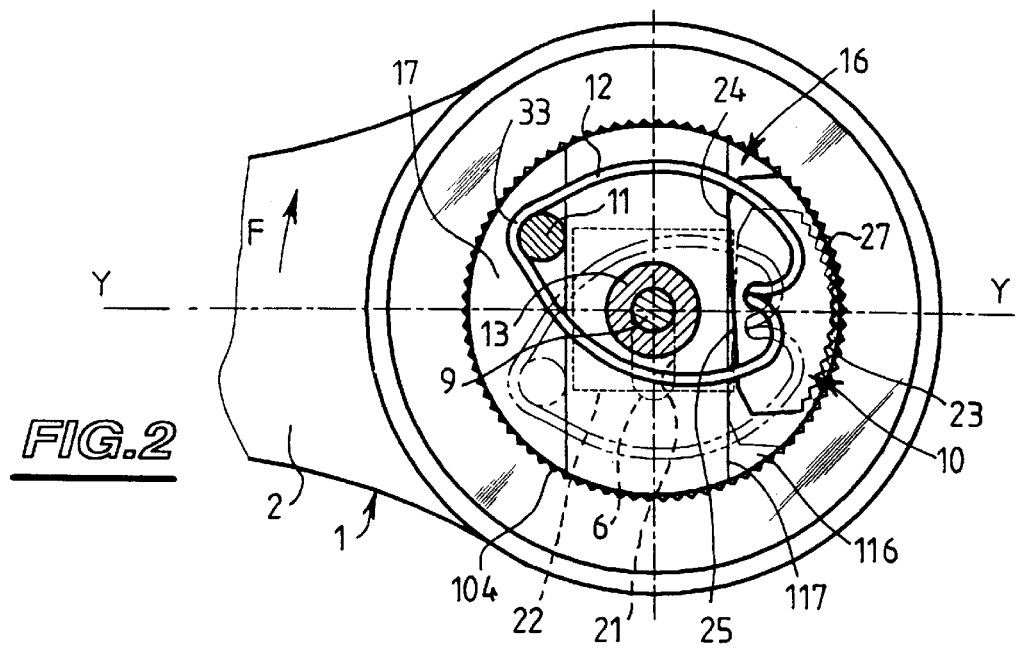
FIG. 2 is a view in transverse section of the head of the ratchet wrench of FIG. 1, taken on line II—II of FIG. 1.

The one-way drive mechanism represented in FIGS. 1 and 2 is incorporated into a ratchet wrench. The wrench body, forming the driving part, has a head 1 with two flat and parallel faces 101, 102, which is arranged at the end of an operating handle 2 of axis Y—Y represented partially in FIG. 2.

A rotor 3 of axis X—X perpendicular to the axis Y—Y and assumed to be horizontal is accommodated in a bore 4 with a toothed lateral wall of the head 1. At its right-hand end it is equipped with an integrally formed polygonal driving end fitting 5, from a lateral wall of which a locking ball 6 protrudes. The rotor 3 is furthermore associated at its left-hand end with a rotary ring 7 for selecting the direction of drive, this ring being externally knurled and having a push button 8 in the form of a cap provided at the end of a push rod 9 for locking/unlocking the ball 6.

The one-way drive mechanism further includes a locking pawl 10 borne by the rotor 3 and controlled by the selection ring 7 via a pin 11 and an operating spring 12.

The rotor 3 is held in the head 1 on the one hand by a hollow screw 13, the head of which bears on the ring 7, and on the other hand by a shoulder 14 formed integrally with the rotor in a way which will be described later.

The through-bore 4 is equipped on its inside wall with peripheral drive teeth 104 (FIG. 2). This bore accommodates the rotor 3, the smooth cylindrical body 15 of which has a diameter slightly smaller than that of the teeth of the bore 4. In its left-hand part, the cylindrical body 15 has two flats 16, 17 with different axial heights, these being diametrically opposed with respect to the axis X—X and opening to the left when studying FIG. 1. The flat 16 delimits two flat sliding surfaces on the body 15, a radial one 116 and an axial one 117, for the locking pawl 10.

A tapped hole 18 emerging on the left-hand face of the body 15 between the flats 16, 17 is formed along the axis X—X of the rotor. The tapped hole 18 is extended coaxially by a duct or drilling formed of a first length 19 of small diameter and of a second length 20 of slightly larger diameter, the latter emerging on the end face of the driving end fitting 5. There is thus a passage right through the rotor 3.

A radial bore 21, forming a passage for accommodating the snap-fastening ball 6, connects the region where the lengths 19, 20 of hole 18 meet to a lateral face 22 of the end fitting 5. For convenience, the bore 21 has been represented in FIG. 1 in the same half-plane as the flat 16, even though these features are in fact arranged at right angles to one another, as represented in FIG. 2. However, the bore 21 may be oriented in any direction whatever with respect to the flat 16.

The locking pawl 10 represented in FIGS. 1 and 2 essentially has a toothed lateral surface 23 with a rounded profile forming an engagement surface designed to interact with the toothed wall 104 of the bore 4. Opposite its teeth it also has two bearing surfaces 24, 25 which are angularly offset by an obtuse angle slightly smaller than 180°. These surfaces form surfaces via which the pawl can bear against the axial sliding surface 117 delimited by the flat 16. The pawl also has a through-drilling 27 for accommodating the two bent-over ends of the operating spring 12, which has the overall shape of a heart. The pawl also bears on the bottom 116 of the flat 16.

The selection ring 7 is arranged on the left-hand face of the head 1. It thus covers the bore 4, in which it is centered by means of an extension piece 28 of small diameter equal to that of the bore 4. The ring 7 bears via its flat peripheral region 29 on the left-hand periphery of this bore at face 101. It is provided with a central drilling 30 with a stepped cross-section which decreases from left to right, the open left-hand end of which is constricted by an overhanging rim 31.

The selection ring 7 also has, on its right-hand face, a blind hole 32 in which the left-hand end of the pin 11 is force-fitted. The other end of this pin protrudes from the right-hand surface of the ring 7 and extends through the heart-shaped spring 12, at a point 33 thereof, into the space delimited by the flat 17.

The hollow screw 13 has a conical head 34 extended by a threaded shank 35. An axial passage 36 passes right through it.

The push rod 9 has a main cylindrical length 37, the diameter of which is substantially equal to that of the passages 19 and 36. It is extended towards the right by a length 38 of small diameter.

The push button 8 has an outside diameter slightly smaller than the passage delimited by the rim 31. On its outer lateral wall it has a peripheral groove which accommodates an elastic ring 39, the outer periphery of which is designed to interact with the inner face of the rim 31.

The push button is secured to the rod 9 and is urged to the left by a helical spring 40 compressed between the push button and a shoulder of the bore 30 of the ring 7.

A small ball 41, which is biased by another spring 42 which bears on an end narrowing 142 of the duct 21, normally keeps the large ball 6 in its locking position, protruding from the end fitting 23, as illustrated in FIG. 1. The ball 41 therefore lies just facing the end of the rod 9.

As seen in FIG. 1, the screw head 34 bears on the smaller shoulder 43 defined by the bore 30 of the ring 7 in such a way that the flat regions 14 of the rotor and 29 of the ring bear respectively on the faces 102 and 101 of the body 1. The threaded shank 35 of the screw passes freely through the smaller-diameter part 130 of the bore 30. The extent to which the screw is tightened into the rotor defines the axial clearance of the rotor, that is to say the distance between the shoulder 14 of the rotor and the edge 29 of the ring.

For this, the screw can be screwed right in, for example, then unscrewed by a quarter of a turn. To avoid subsequent loosening of the screw, it is possible to coat some of the threads thereof with locking glue before fitting.

It is understood that the rotor may be mounted and adjusted on any ratchet body which has a bore of the appropriate diameter, without the length of the bore needing to be defined accurately. This is because adjusting the screw 13 makes it possible to compensate for any difference in length of the bore 4 as compared with the theoretical length.

As is known per se, in order to drive the rotor in one direction, the spring 12 holds the ratchet pawl 10 in engagement with the peripheral teeth of the bore 4 in a contact region which is offset with respect to the longitudinal axis Y—Y of the wrench. Thus, in the position illustrated in solid line in FIG. 2, the pawl 10 allows the rotor to rotate freely with respect to the driving part when the latter is driven in the direction of rotation indicated by the arrow F in FIG. 2. Furthermore, using a wedge effect it prevents relative movement of these two components in the other direction.

In order to reverse the direction of drive of the wrench, from the position represented in solid line in FIG. 2, the angular displacement of the selection ring 7, via the pin 11, displaces the heart-shaped spring 12 as far as the position indicated in dot and dash line in FIG. 2. The pawl 10 is therefore operated and slides along the sliding surface 117 while at the same time tilting from its bearing face 24 towards its bearing face 25. The toothed surface 23 of the pawl thus interacts with another contact region for the toothed wall of the bore 4, this region being offset on the other side of the axis Y—Y.

In the normal locked position represented in FIG. 1, in which the ring 39 is resting against the narrowing 31 of the ring 7, the ball 41, loaded by the spring 42, bears on the one hand on the rear region of the ball 6 and on the other hand against the end of the length 19 of the drilling 18. In particular, the diameter of the ball 41 is such that its center is situated slightly to the right of the axis of the bore 21 accommodating the ball 6.

As represented, the axes of the lengths 19 and 20 may be slightly offset as a function of the diameters of the balls 6 and 41 and of kinematic constraints. Furthermore, the axis of the length 20 may also not be parallel to the axis of the length 19.

To fit a socket onto the end fitting 5, all that is required is for the push button 8 to be pushed manually in order to push in the ball 41, which releases the ball 6, which is then free to retract into the duct 21.

After the push button has been released, when the ball 6 is facing the groove formed in the socket, this ball returns to its position represented in FIG. 1 under the effect of the action of the ball 41 urged by the spring 42.

To release the socket, pushing on the push button 8 again pushes in the ball 41 against the spring 42 under the action of the push rod. Now that the ball 41 has been moved aside, the ball 6 is free to retract into the bore.

The embodiment of FIGS. 3 and 4 differs from the previous embodiment in the following points.

Firstly, the shoulder 14 by which the rotor bears on the face 102 of the body 1 is borne by a circlip 51 accommodated in a circular groove 52 of the rotor.

This makes it possible for the rotor 3 and all the associated accessories (locking pawl 10, spring 12, control ring 7, hollow screw 13, locking ball 6 and its push rod control mechanism) to be produced in the form of an interchangeable preassembled module. In this case, the preassembled module arrives at the user with the push button 8 separate. The user then need only mount and adjust the preassembled module in the wrench body as described earlier, then fit the push button.

Furthermore, the device for locking the ball 6 is modified as follows.

At the right-hand end of the push rod, the small-diameter length 38 is replaced by a widened length 53 sliding in the length 20 of the bore of the rotor, which has a diameter which is markedly enlarged as compared with that of FIG. 1. This length of rod 53 has its axis parallel to that of the length 19 but offset with respect to the latter.

The small ball 41 and the spring 42 of FIG. 1 are omitted. A recess 54 in the shape of a portion of a sphere or of a cylinder of axis perpendicular to the axis X'—X' and the radius of curvature of which is substantially equal to that of the ball 6 is formed on the lateral wall of the length of rod 53. This recess 54 is extended to the right by a flat (or, as an alternative, channel-section) ramp 55 forming a cam surface. The ramp 55 is inclined towards the left and towards the bottom of the recess 54 and makes an angle of between 10° and 20°, and for example substantially 17°, with the axis X—X.

Thus the push rod is positioned so that it can rotate with respect to the rotor, thanks to the offset between the axes of the lengths 37 and 53 of the rod 9, which means that the ramp 55 is facing the bore 21.

Figure 3:
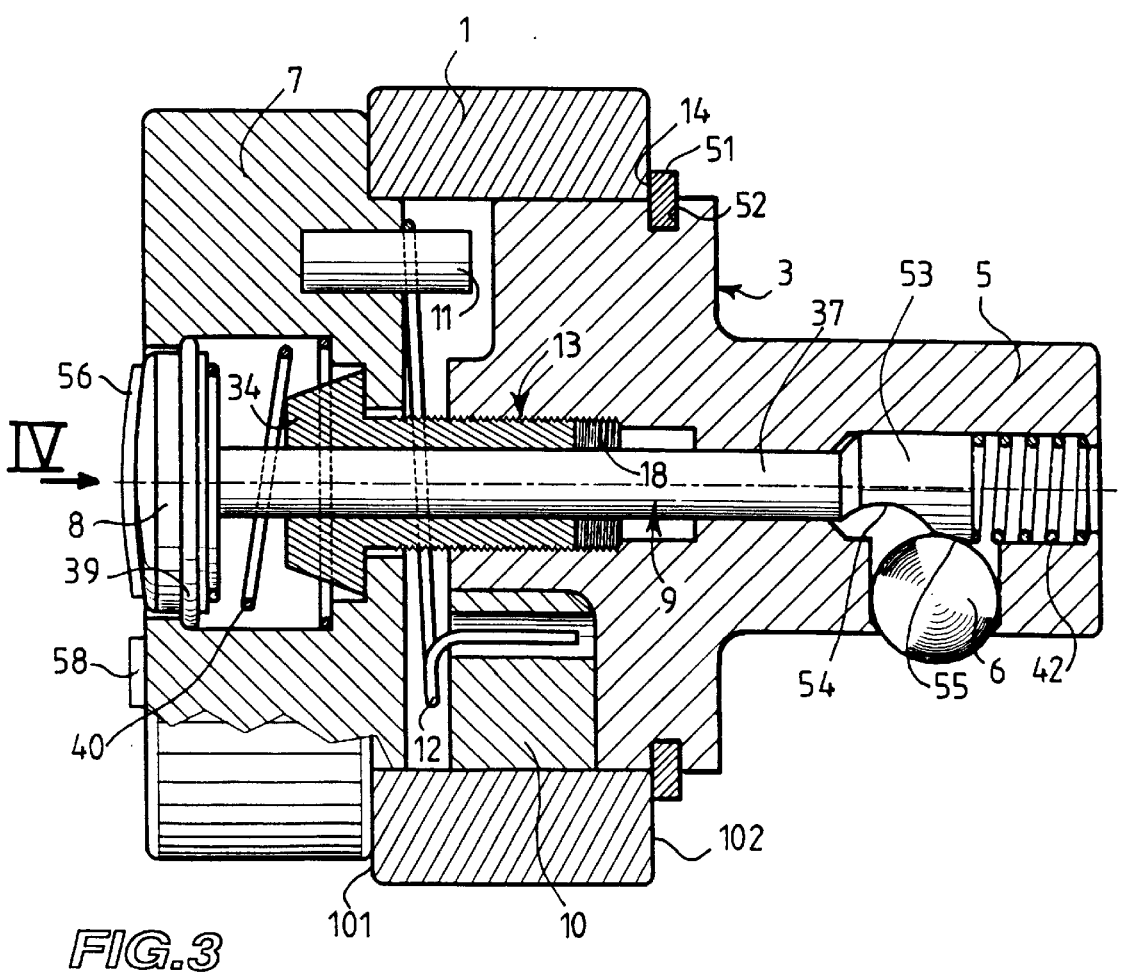
FIG. 3 is a view in longitudinal section of an alternative form.
Figure 4:
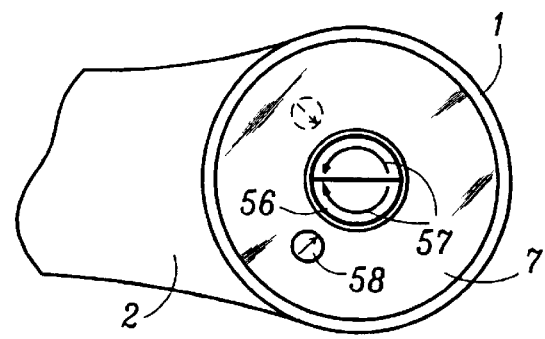
FIG. 4 is a view of the alternative form of FIG. 3, taken in the direction of the arrow IV of FIG. 3.

The push rod is constantly returned towards its locked position in FIG. 3 by the action of the spring 40 on the push button 8.

In this position, the ball 6 bears on the ramp 55 at the inner end of the bore 21 and protrudes out of this bore, resting against an exit narrowing thereof, as before.

Finally, the fact that the push rod is positioned in such a way that it can rotate with respect to the rotor is put to good use to indicate to the user the direction in which the ratchet is driving.

For that (FIGS. 3 and 4) an insert 56 stuck onto the push button bears a mark 57 consisting of two arrows indicating the two possible directions of rotation, while the outer face of the control ring 7 bears another insert 58, close to the push button, on which there is an index consisting of an arrow pointing radially.

Irrespective of the angular position of the rotor with respect to the body 1, the ring 7 can adopt two angular positions with respect to the rotor, as explained earlier. In one of these positions, the index 58 faces one of the two arrows of the mark 57, as represented in solid line in FIG. 4. In the other position of the ring 7, which corresponds to the other direction of drive of the ratchet, the index 58 is facing the other arrow of the mark 57.

The recess 54 may, as an alternative, be formed of a peripheral groove made in the cylindrical wall of the length 53.

The embodiment of FIGS. 5 and 6 differs from the previous embodiment in the following points.

First of all, the mechanism further includes a generally cup-shaped resting plate 59. This plate has an outer collar 60 which bears on the top face of the selection ring 7, in the radially internal region thereof. The end of the cup has a central passage 61 with a bevelled edge on which the head 34 of the screw 13, which is conical, bears. The cup forming the resting plate 59 thus delimits at its center a cylindrical recess 62, the opening of which is constricted by a re-entrant peripheral rim 63 formed integrally with the plate. The push button 8 is accommodated in this recess, and the spring 40 for returning the push rod is compressed between the inner face of the push button and the head 34 of the screw.

During use, the user can place one hand flat on the plate 59, and this allows him to apply an axial force to the socket without the risk of inadvertently reversing the direction of drive of the ratchet.

The index 58 of the ring 7 is correspondingly borne by the radially outer region thereof, the collar 60 of the plate being inserted, as viewed in plan (FIG. 6), between this index and the mark 57 borne by the push button.

Furthermore, in this embodiment too, there is the locking system with two balls 6 and 41 of FIG. 1, as well as the small-diameter end length 38 of the push rod.

However, in this case, to prevent the push rod from rotating with respect to the rotor, the length 38 has a flat 64 with which a pin 65 interacts, this pin being force-fitted into a recess formed in the wall of the length of bore 19 facing the bore 21 of the end fitting 5.

Figure 5:
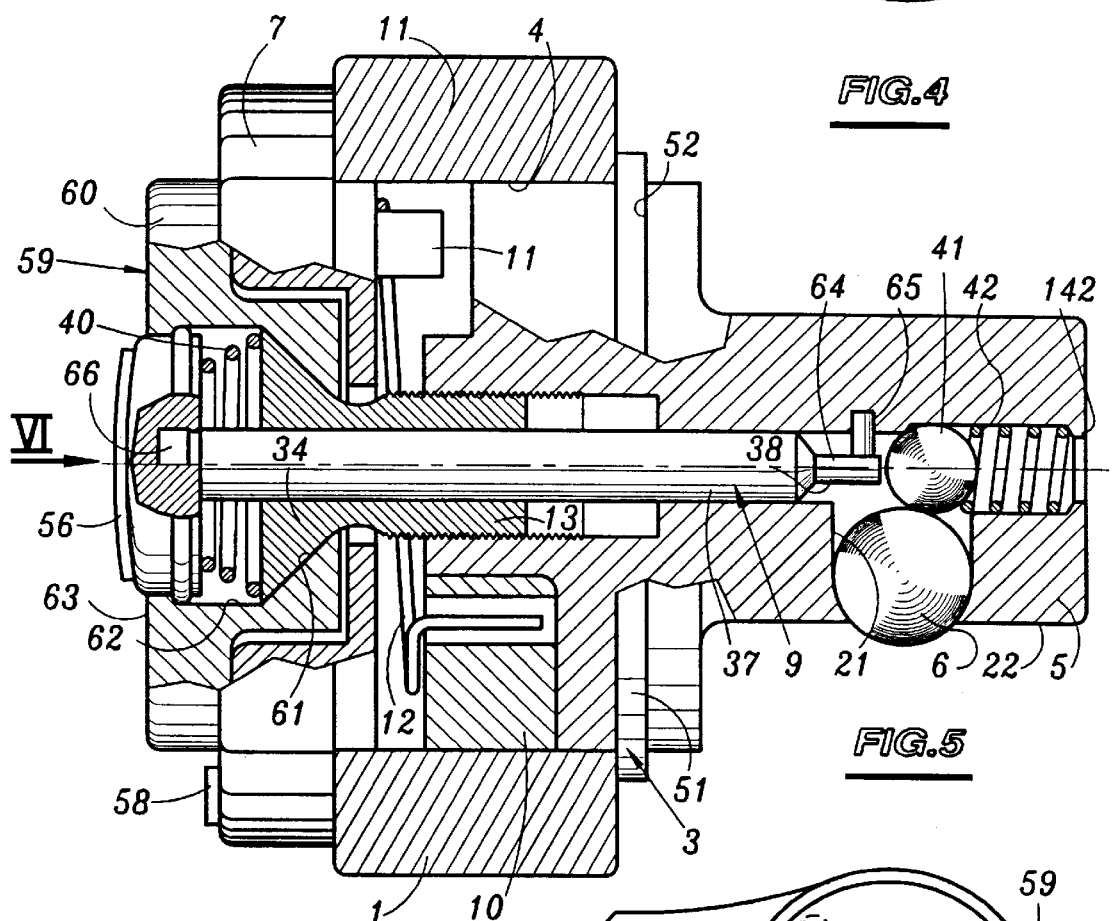
FIG. 5 is a view in longitudinal section of another alternative form.
Figure 6:
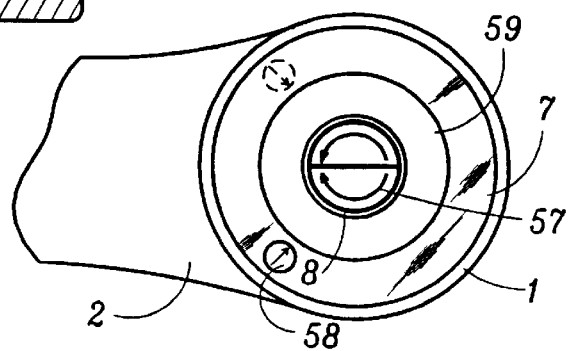
FIG. 6 is a view of the alternative form of FIG. 5, taken in the direction of the arrow VI of FIG. 5.

It may also be seen from FIG. 5 that the left-hand end of the push rod has a profile 66 for snap-fastening in a mating cavity of the push button, this profile preventing the push button and the rod from moving both in rotation and in translation, independently of each other.

As an alternative, to make mounting easier, the right-hand end of the push rod may be provided with two symmetrical flats.

I claim:

1. A mechanism, comprising:

a driving part having a bore therein, said bore having a bore diameter, a first bearing face at one end of said bore and a second bearing face at the other end of said bore;

a rotor accommodated in said bore, said rotor having a shoulder which bears on said first bearing face;

a one-way drive mechanism engaged between said driving part and said rotor;

an annular component coaxial with said bore and having an outside diameter greater than the bore diameter and bearing on said second bearing face;

an axial holding and adjustment screw which passes through a central orifice in said annular component, said screw having a head which holds said annular component on said second bearing face, and said screw being screwed into said rotor such that said rotor is held axially in said bore between said annular component and said shoulder of said rotor with an axial clearance determined as a function of the actual distance between said first and second bearing faces and by adjustment of said screw;

wherein said rotor comprises an axial end fitting for driving a rotary member, said axial end fitting comprising a lateral surface, an opening onto said lateral surface and a retaining element for holding the rotary member on said axial end fitting accommodated in said opening;

wherein said holding and adjustment screw comprises an axial passage and said rotor comprises a duct, said axial passage and said duct accommodating a rod therein for controlling said retaining element; and wherein said rod is displaceable between a locking position for locking the rotary member, in which position said retaining element is blocked so as to protrude from said axial end fitting, and a release position, in which position said retaining element can be retracted into said axial end fitting.

2. The mechanism of claim 1, wherein said one-way drive mechanism comprises said bore having a toothed lateral wall and said rotor having a moving blocking pawl for engaging said rotor with said driving part for rotational movement as one in one direction.

3. The mechanism of claim 1, wherein said rod has a push button at one end thereof for axial displacement of said rod with respect to said rotor and at least one elastic member urging said rod toward said locking position.

4. The mechanism of claim 3, and further comprising structure axially fixed with respect to said rotor defining a recess receiving said push button therein, said push button covering said screw and having an external peripheral groove having an elastic ring therein, said push button and said elastic ring being displaceable into said recess, and said recess having a rim having a diameter greater than said push button and smaller than said elastic ring.

5. The mechanism of claim 4, wherein said recess has a bottom and said at least one elastic member comprises a spring compressed between said bottom of said recess and said push button.

6. The mechanism of claim 4, wherein said push button comprises a piece separate from said one end of said rod that is attached to said one end of said rod, whereby said screw can be accessed when said rod is in said axial passage and said duct.

7. The mechanism of claim 6, wherein said one end of said rod and said push button comprise complementary means for preventing at least one of axial and rotational movement of said one end of said rod with respect to said push button.

8. The mechanism of claim 1, wherein said duct comprises two successive duct portions, at least one of said two successive duct portions having an axis parallel to said axial passage of said holding and adjustment screw.

9. The mechanism of claim 8, wherein said two successive duct portions have axes that are parallel and offset with respect to each other.

10. The mechanism of claim 1, wherein said shoulder of said rotor is integrally formed with said rotor.

11. The mechanism of claim 1, wherein said shoulder of said rotor is defined by a circlip accommodated in a groove of said rotor.

12. The mechanism of claim 1, and further comprising:
selecting means for selecting a drive direction of said one-way drive mechanism, said selecting means being movable with respect to said rotor, said selecting means comprising means preventing angular movement of said rod with respect to said rotor, and said rod being axially displaceable with respect to said rotor; and
a push button at one end of said rod rotatably fixed with respect to said rod;
wherein said push button comprises a mark and said selecting means comprises an index interactive with said mark so as to indicate the drive direction of said one-way drive mechanism.

13. The mechanism of claim 12, wherein said selecting means comprises a rotary ring, said rotary ring comprising said annular component having said central orifice, and said mark being visible at the center of said rotary ring.

14. The mechanism of claim 13, wherein a freely rotatable and manually engageable plate is located between said head of said screw and said rotary ring and between said mark and said index.

15. The mechanism of claim 1, wherein a freely rotatable and manually engageable plate is located between said head of said screw and said annular component.

16. The mechanism of claim 1, wherein said one-way drive mechanism comprises a ratchet mechanism.

17. A mechanism, comprising:
a driving part having a bore therein, said bore having a bore diameter, a first bearing face at one end of said bore and a second bearing face at the other end of said bore;
a rotor accommodated in said bore, said rotor having a shoulder which bears on said first bearing face;
a one-way drive mechanism engaged between said driving part and said rotor;
an annular component coaxial with said bore and having an outside diameter greater than the bore diameter and bearing on said second bearing face;
an axial screw which passes through a central orifice in said annular component, said screw having a head which holds said annular component on said second bearing face, and said screw being screwed into said rotor such that said rotor is held axially in said bore;
wherein said rotor comprises an axial end fitting for driving a rotary member, said axial end fitting comprising a lateral surface, an opening onto said lateral surface and a retaining element for holding the rotary member on said axial end fitting accommodated in said opening;
wherein said screw comprises an axial passage and said rotor comprises a duct, said axial passage and said duct accommodating a rod therein for controlling said retaining element; and
wherein said rod is displaceable between a locking position for locking the rotary member, in which position said retaining element is blocked so as to protrude from said axial end fitting, and a release position, in which position said retaining element can be retracted into said axial end fitting.

18. The mechanism of claim 17, wherein said one-way drive mechanism comprises said bore having a toothed lateral wall and said rotor having a moving blocking pawl for engaging said rotor with said driving part for rotational movement as one in one direction.

19. The mechanism of claim 17, wherein said rod has a push button at one end thereof for axial displacement of said rod with respect to said rotor and at least one elastic member urging said rod toward said locking position.

20. The mechanism of claim 19, and further comprising structure axially fixed with respect to said rotor defining a recess receiving said push button therein, said push button covering said screw and having an external peripheral groove having an elastic ring therein, said push button and said elastic ring being displaceable into said recess, and said recess having a rim having a diameter greater than said push button and smaller than said elastic ring.

21. The mechanism of claim 20, wherein said recess has a bottom and said at least one elastic member comprises a spring compressed between said bottom of said recess and said push button.

22. The mechanism of claim 20, wherein said push button comprises a piece separate from said one end of said rod that is attached to said one end of said rod, whereby said screw can be accessed when said rod is in said axial passage and said duct.

23. The mechanism of claim 22, wherein said one end of said rod and said push button comprise complementary means for preventing at least one of axial and rotational movement of said one end of said rod with respect to said push button.

24. The mechanism of claim 17, wherein said duct comprises two successive duct portions, at least one of said two successive duct portions having an axis parallel to said axial passage of said holding and adjustment screw.

25. The mechanism of claim 24, wherein said two successive duct portions have axes that are parallel and offset with respect to each other.

26. The mechanism of claim 17, wherein said shoulder of said rotor is integrally formed with said rotor.

27. The mechanism of claim 17, wherein said shoulder of said rotor is defined by a circlip accommodated in a groove of said rotor.

28. The mechanism of claim 17, and further comprising:
   selecting means for selecting a drive direction of said one-way drive mechanism, said selecting means being movable with respect to said rotor, said selecting means comprising means preventing angular movement of said rod with respect to said rotor, and said rod being axially displaceable with respect to said rotor; and
   a push button at one end of said rod rotatably fixed with respect to said rod;
   wherein said push button comprises a mark and said selecting means comprises an index interactive with said mark so as to indicate the drive direction of said one-way drive mechanism.

29. The mechanism of claim 28, wherein said selecting means comprises a rotary ring, said rotary ring comprising said annular component having said central orifice, and said mark being visible at the center of said rotary ring.

30. The mechanism of claim 29, wherein a freely rotatable and manually engageable plate is located between said head of said screw and said rotary ring and between said mark and said index.

31. The mechanism of claim 17, wherein a freely rotatable and manually engageable plate is located between said head of said screw and said annular component.

32. The mechanism of claim 17, wherein said one-way drive mechanism comprises a ratchet mechanism.

33. The mechanism of claim 17, comprising means for adjusting a distance between said annular component and said shoulder.

34. A ratchet tool, comprising:
   a driving part having a bore therein, said bore having a bore diameter, a first bearing face at one end of said bore and a second bearing face at the other end of said bore;
   a rotor accommodated in said bore, said rotor having a shoulder which bears on said first bearing face;
   a one-way drive ratchet mechanism engaged between said driving part and said rotor;
   an annular component coaxial with said bore and having an outside diameter greater than the bore diameter and bearing on said second bearing face;
   an axial holding and adjustment screw which passes through a central orifice in said annular component, said screw having a head which holds said annular component on said second bearing face, and said screw being screwed into said rotor such that said rotor is held axially in said bore between said annular component and said shoulder of said rotor with an axial clearance determined as a function of the actual distance between said first and second bearing faces and by adjustment of said screw;
   wherein said rotor comprises an axial end fitting for driving a rotary member, said axial end fitting comprising a lateral surface, an opening onto said lateral surface and a retaining element for holding the rotary member on said axial end fitting accommodated in said opening;
   wherein said holding and adjustment screw comprises an axial passage and said rotor comprises a duct, said axial passage and said duct accommodating a rod therein for controlling said retaining element;
   wherein said rod is displaceable between a locking position for locking the rotary member, in which position said retaining element is blocked so as to protrude from said axial end fitting, and a release position, in which position said retaining element can be retracted into said axial end fitting; and
   wherein said driving part is connected to an operating handle.

35. A ratchet tool, comprising:
   a driving part having a bore therein, said bore having a bore diameter, a first bearing face at one end of said bore and a second bearing face at the other end of said bore;
   a rotor accommodated in said bore, said rotor having a shoulder which bears on said first bearing face;
   a one-way drive ratchet mechanism engaged between said driving part and said rotor;
   an annular component coaxial with said bore and having an outside diameter greater than the bore diameter and bearing on said second bearing face;
   an axial screw which passes through a central orifice in said annular component, said screw having a head which holds said annular component on said second bearing face, and said screw being screwed into said rotor such that said rotor is held axially in said bore;
   wherein said rotor comprises an axial end fitting for driving a rotary member, said axial end fitting comprising a lateral surface, an opening onto said lateral surface and a retaining element for holding the rotary member on said axial end fitting accommodated in said opening;
   wherein said screw comprises an axial passage and said rotor comprises a duct, said axial passage and said duct accommodating a rod therein for controlling said retaining element;
   wherein said rod is displaceable between a locking position for locking the rotary member, in which position said retaining element is blocked so as to protrude from said axial end fitting, and a release position, in which position said retaining element can be retracted into said axial end fitting; and
   wherein said driving part is connected to an operating handle.

* * * * *